United States Patent [19]

Peickert et al.

[11] Patent Number: 4,946,124
[45] Date of Patent: Aug. 7, 1990

[54] SPRING CLAMP AND KIT TO SUPPLY HOT AIR TO CARBURETOR

[75] Inventors: Marlin W. Peickert, North Oaks; LeRoy A. Kuta, Mahtomedi, both of Minn.

[73] Assignee: Pollution Control Auto Parts, Inc., St. Paul, Minn.

[21] Appl. No.: 275,895

[22] Filed: Nov. 25, 1988

[51] Int. Cl.$^5$ .............................................. A47B 96/06
[52] U.S. Cl. ................................ 248/231.8; 123/556; 248/65
[58] Field of Search ................ 248/72, 65, 231.8, 79, 248/75; 123/556

[56] References Cited

U.S. PATENT DOCUMENTS

| | | | |
|---|---|---|---|
| 1,221,536 | 4/1917 | Hopkins | 123/556 |
| 1,390,389 | 9/1921 | Rosen | 248/231.8 |
| 1,474,968 | 11/1923 | Henszey | 123/556 X |
| 2,787,005 | 4/1957 | Zinkil | 248/75 UX |
| 3,273,845 | 9/1966 | Jepsen | 248/231.8 |
| 3,319,913 | 5/1967 | Schoepe et al. | 248/75 |
| 4,453,524 | 6/1984 | Lee | 123/556 |
| 4,520,787 | 6/1985 | Midorikawa | 123/556 |

Primary Examiner—J. Franklin Foss
Attorney, Agent, or Firm—Frederick A. Fleming

[57] ABSTRACT

The clamp serves to position the mouth of an air duct against the surface of the exhaust manifold of an automotive engine so that hot air may be drawn into the duct. The clamp is a spring steel strap of U shape with shoulders at midlength of the limbs. Endwise of the shoulders the arms converge in a vee to accommodate various shapes of manifold pipes. The U neck of the clamp fits within the throat of the air duct, holding it by expansion, while the arms hold the exhaust manifold by contraction. The complete kit includes the clamp, an air duct, and a cover to enhance the collection of hot air. The kit serves to restore the hot air collection function in older vehicles which have lost original parts.

2 Claims, 1 Drawing Sheet

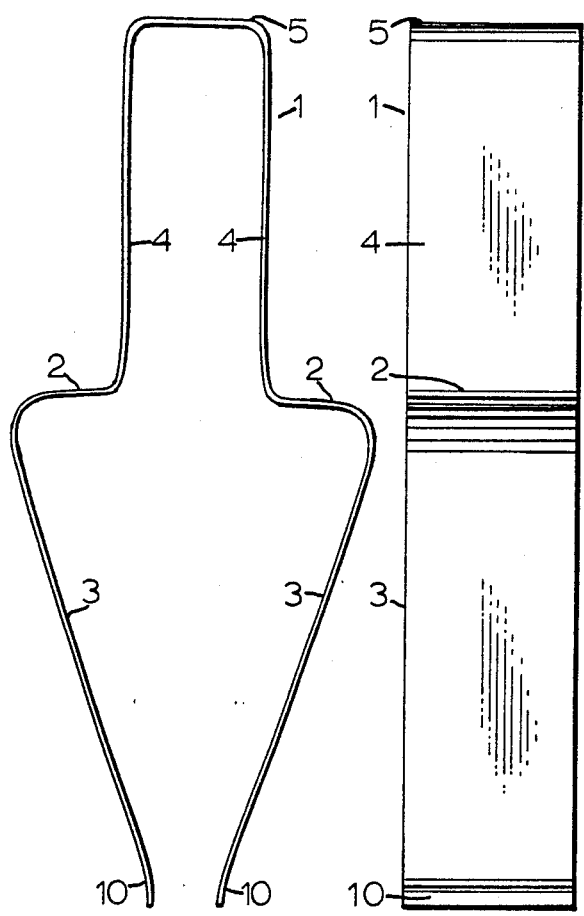
FIG.1  FIG.2
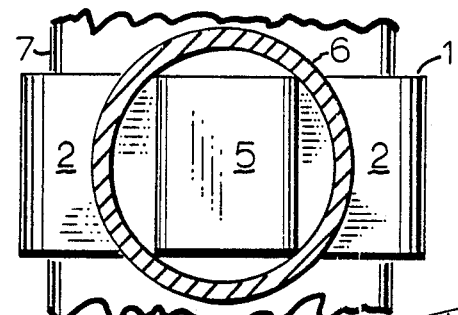
FIG.4
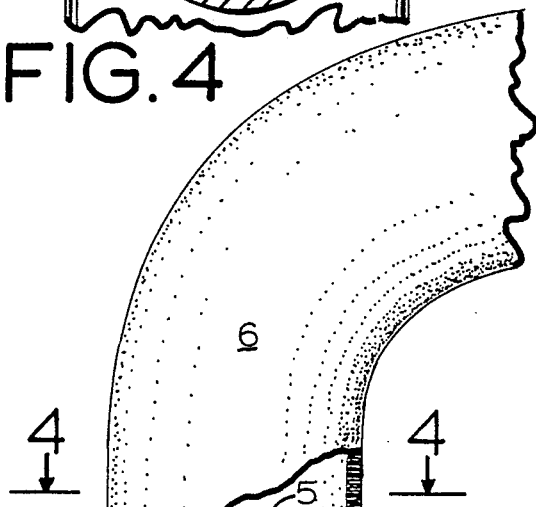
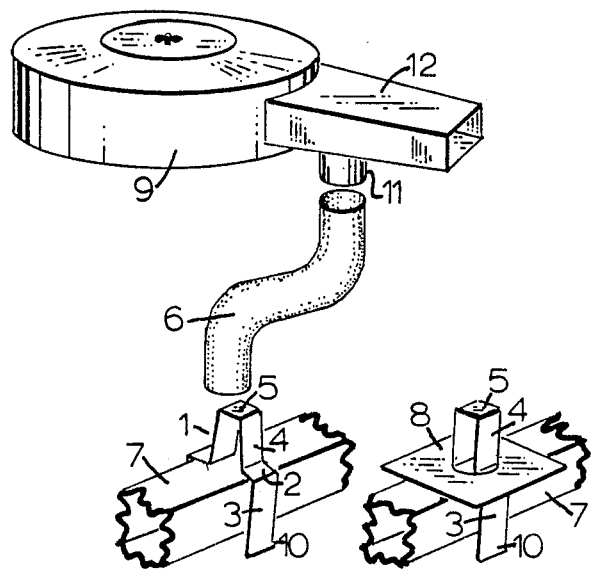
FIG.5  FIG.6
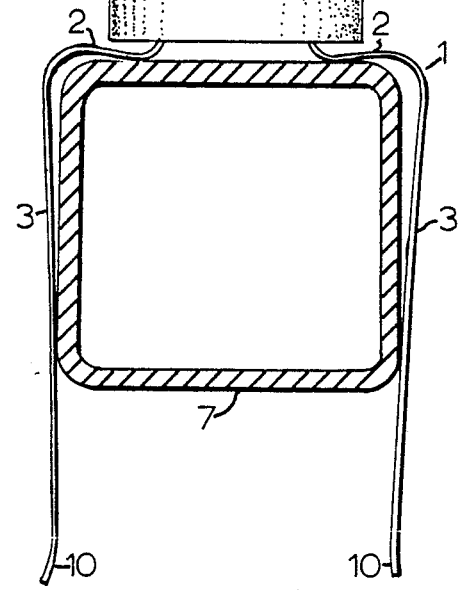
FIG.3

SPRING CLAMP AND KIT TO SUPPLY HOT AIR TO CARBURETOR

BACKGROUND OF THE INVENTION

1. Field of the Invention

The invention is associated with several fields: carburetion of automotive engines; spring clamping devices; couplings and connectors; and automotive aftermarket repair kits.

2. Prior Art

Existing means for gaining the objective of the invention have a different inventive concept. A competitive kit is available in the aftermarket with a metal collar to be fastened to the surface of an exhaust manifold with a hose clamp, in which the band of the hose clamp must be threaded through slots in the collar and in which the collar serves as the base for an air duct to be fastened there by yet another hose clamp. Because of the remote location of the exhaust manifold, deep within the hood, installation of the hose clamps is awkward and aggravating.

3. The Problem

Automotive engine performance is inefficient during a cold start, when the crankcase oil is viscous and the air taken into the carburetor is cold. One of the problems in gaining efficient combustion of gasoline is to evaporate the fuel droplets produced by the carburetor, a process that is only achieved by supplying the latent heat of vaporization of the fuel. At start up, that heat is gained largely from the air supplied for combustion, which is taken in through the air cleaner via a tube called the snorkel or air horn. During a cold engine start, the automatic choke provides a fuel/air mixture that is rich in fuel but poor in air, so that if that air could be hot air, the needed heat would be supplied and the transition to hot engine performance would be facilitated. Now, when the engine has just been cranked to a start, and when the engine itself and the coolant temperature are still cold, the exhaust gases passing through the exhaust manifold are immediately hot, so that the manifold itself carrying the gases quickly becomes hot. Since the 1960s, many automobile manufacturers have adopted the practice of using the hot exhaust manifold as a "stove" to heat air for the carburetor during the early stages of operation. The means with which this has usually been done includes a spaced-off metal shroud mounted on a portion of the exhaust manifold, to collect and channel the hot air, an aperture on the shroud with an upstanding metal collar, and a flexible air duct mounted with a hose clamp upon that collar at one end and upon a second collar on an aperture on the snorkel of the air cleaner at the other end. A thermostatically controlled valve within the snorkel regulates the mixture of hot air from the manifold with ambient air from the primary intake of the snorkel.

In the interest of controlling air pollution, many localities now require periodic inspection of air pollution control equipment on automobiles, and in connection with such inspections it has been found that substantial numbers of vehicles have missing or defective hot air supply systems. The shroud and/or its collar are often found to be missing or useless because of corrosion. The attachment hardware for the shroud is often found to be so badly rusted that attachment of a new shroud would entail costly repairs that could not be justified in light of the diminished value of the vehicle as a used car.

SUMMARY OF THE INVENTION

The invention is focused upon a unique spring clamp which serves to position the mouth of a flexible, extensible air duct next to the surface of the exhaust manifold so that hot air may be drawn into the duct. Integral to the invention is the selection of an air duct of circumference to fit the hot air intake port on the snorkel of the air cleaner. A useful but optional part is an apertured metal cover which may be placed between the mouth of the air duct and the surface of the exhaust manifold and which may be bent to form a shroud on the manifold for enhanced collection of hot air.

It is the object of the invention to provide a kit with parts to effect an easy, inexpensive restoration of the hot air supply to the carburetors in vehicles whose original equipment is defective.

The invention avoids the costly repair otherwise needed to restore the hot air system to its original form, and it is an improvement upon other aftermarket repair kits which are troublesome to install. The repair using our kit is made in a few minutes without the need for tools.

DESCRIPTION OF THE DRAWINGS

FIG. 1 is an edge elevation of the clamp showing its configuration at rest.

FIG. 2 is a side elevation of the clamp corresponding to FIG. 1.

FIG. 3 is an edge elevation of the clamp in its stressed configuration, as found in association with the elements of its working environment, with parts shown in section and other parts shown broken away.

FIG. 4 is a sectional view taken along line 4—4 of FIG. 3.

FIG. 5 is a perspective view showing the kit in an intermediate stage of assembly on an air cleaner above and an exhaust manifold below.

FIG. 6 is a perspective view similar to FIG. 5 showing the use of an optional cover.

DESCRIPTION OF THE PREFERRED EMBODIMENT

1. Introduction

The invention features a spring steel clamp 1 (FIGS. 1-6) fabricated from a strap of sheet metal and resembling a U-shaped tongs except that about midway of their length, the limbs turn outward to form the shoulders 2 and then turn downward and inward so that the ends of the limbs approach one another in the form of a vee. The portion of the limbs endward of the shoulders will be called the arms 3 and the portion above the shoulders will be called the neck 4. The top middle of the clamp, defined by the bends that establish the breadth of the clamp will be called the head 5. The bends that define the shoulders 2 will be referred to as the S bends.

The clamp 1 serves as a one-piece connector to removably attach the mouth of a flexible, extensible air duct 6 in juxtaposition to the surface of an exhaust manifold 7 (FIGS. 3-5). As seen by comparison of FIG. 1 and FIG. 3, the body of the exhaust manifold 7 deflects the arms 3, stressing the clamp primarily within the S bends of the shoulders 2, and causing the neck 4 of the clamp to tend to expand within the internal circumference of the mouth of the air duct 6. The energy within the spring clamp is primarily stored up within the S bends, and it works to hold the air duct 6 by internal expansive clamping action and to hold the manifold 7 by antagonistic external clamping action. The engagement of the neck of the clamp upon the mouth of the air duct is not apparent in FIG. 3 but is readily seen in FIG. 4. The internal expansive clamping action of the neck 4 within the mouth of the air duct 6 is exerted by the edges of the neck which are hard and relatively sharp and which tend to bite into the malleable aluminum substance of the duct 6, thereby augmenting the hold.

Note that when properly positioned against the manifold, there is a gap between the mouth of the duct 6 and the surface of the manifold 7. It is through that gap that hot air is drawn into the duct.

2. Detailed Discussion

The head 5 of the clamp, which appears as a rectangle in FIG. 4. is dimensioned so that for a strap of given width, its breadth is substantially the largest that will fit within the circular area of the duct 6, although some tolerance is provided to facilitate insertion of the neck 4 into the throat of the duct. The head 5 thus supports the sides of the neck 4 within the air duct 6 for a snug fit. Otherwise, the forces acting on the clamp in its stressed configuration would work to taper the neck and loosen the hold. The head 5 is illustrated (FIGS. 1 and 4) as substantially flat, but alternative head configurations will serve to support the neck provided that effective separation to prevent tapering of the neck 4 is maintained. One such shape would be semicircular in a view comparable to FIG. 1.

The neck 4 must be sufficiently long to isolate the shoulders 2 from constraint imposed by the head 5 so that the sides of the neck can flex within the mouth of the duct for expansion.

To provide for the needs of the wide variety of automotive vehicles subject to this repair, spring clamps of this kind must be supplied in several head dimensions, to fit air ducts of the internal diameters found in service.

The application of the spring clamp is illustrated in FIG. 5, which shows the relationship of the clamp 1 to the exhaust manifold 7 below and to the air cleaner 9 and snorkel 12 above, the parts being shown in relation to a phantom engine.

To install the clamp 1, the arms 3 are spaced apart to accept the body of the manifold 7 and the clamp is thrust upon the manifold until the shoulders 2 are in contact with the manifold. The installation is facilitated by the tangs 10 which are the outwardly curved ends of the arms 3, allowing the ends to slide easily over the surface of the manifold which usually is found to be rough. When the clamp is thus saddled upon the manifold it is easily adjusted into a most favorable position. The installer next places the mouth of the air duct 6 upon the head 5 of the clamp and thrusts the throat of the duct upon the upstanding neck 4, causing the arms 3 to close tightly upon the manifold 7 as the neck is constricted by the circular mouth of the duct. To facilitate the placement of the air duct upon the neck 4 the installer may elect to manually constrict the shoulders 2 while applying the air duct.

The width of the shoulders 2 is designed to accommodate the body of manifolds found in the trade, which vary somewhat in girth. The vee configuration of the arms 3 provides for grasping manifolds of various shapes, whether round, oval, rectangular or irregular. A manifold of square cross section was arbitrarily selected for the illustrations.

A secondary purpose of the neck 4 is to receive heat from the arms 3 and shoulders 2 of the clamp by conduction and to give up that heat by convection to the air drawn into the duct.

The cover 8 (FIG. 6), an optional accessory, is a piece of malleable sheet metal with an aperture to accommodate the head 5 and to slide down the neck of the clamp to the shoulders 2. The shape and dimensions of the cover may be adapted to suit the installation at hand although most jobs are served by the square sheet with circular aperture illustrated in FIG. 6. The sides of the cover 8 may be bent down over the manifold as a shroud to promote the collection of hot air into the air duct. Use of the cover 8 will facilitate the assembly of the duct 6 upon the neck 4 because it will constrict the neck, closing the arms 4 on the manifold to establish its position prior to attachment of the duct 6. The aperture in the cover 8 is slightly larger than the internal diameter of the air duct 6 so that the final constriction of the neck 4 is by mouth of the duct 6.

3. Mechanical Description

The clamp is fabricated from annealed carbon steel sheet metal. Flat strap blanks are subjected to successive press punch operations using dies to form the tangs 10 and shoulders 2 and then the head 5. The finished shapes are then hardened by heat treatment to develop the spring character. By trial and error it was found that AISI (American Iron and Steel Institute) 1075 carbon steel of 0.028 inch gauge when hardened to 44 to 46 on the Rockwell C scale affords optimum characteristics.

4. Application

To provide an assembly of parts for the reestablishment of the hot air supply, the spring clamp 1 of our invention is combined with an appropriately sized flexible, extensible air duct 6, together with the optional cover 8. We have assembled those articles in the form of kits for the automotive aftermarket. A clamp 1 must be selected whose head 5 is of correct breadth for the given air duct 6. Air duct size is determined by the external diameter of the collar 11 on the snorkel 12 of the air cleaner 9. The needs are satisfied with air ducts of internal diameters of 1.5 inch, 1.75 inch, and 2.00 inch. Our kits include aluminum duct obtained from the Wire Mold Company of West Hartford, Conn., as type CRM duct. The thin walls of the duct are helically pleated, the pleats being approximately one-eighth inch deep and number about thirty to the running inch, affording a product of exceptional flexibility and extensiblity. Attachment of the duct to the collar 11 is secured by interference fit.

We claim:

1. A clamp, to hold the mouth of an air duct against a pipe or similar object, made from a strap of spring steel, as illustrated and described in the specification, and characterized by the features: a head, a neck, shoulders, and arms; the head serving to maintain the width of the neck; the neck serving to insert into the throat of the duct and to hold it by spring expansion; the shoulders serving to adapt the clamp to the width of the pipe and to maintain the spring forces by deflection of the S bends which define the shoulders; and the arms serving to hold the pipe by spring contraction, which clamp is employed in combination with a malleable sheet metal cover having an aperture to accommodate the neck of the clamp and with which cover the arms of the clamp may be closed upon the pipe prior to the engagement of the duct upon the neck of the clamp and which cover may be bent to shroud the manifold.

2. A clamp, as in claim 1, further characterized by tangs at the ends of the arms, as illustrated and described in the specification, to facilitate placement of the clamp upon the pipe.

* * * * *